3,409,657
ESTERS AND ETHERS OF TRIMETHYL PENTYL SULFATES AND THEIR PREPARATION
Alden E. Blood and James D. Heller, Longview, Tex., assignors to Eastman Kodak Company, Rochester, N.Y., a corporation of New Jersey
No Drawing. Filed Jan. 8, 1965, Ser. No. 424,182
8 Claims. (Cl. 260—458)

ABSTRACT OF THE DISCLOSURE

Water-soluble surface-active compounds are prepared by sulfating 2,2,4-trimethylpentane-1,3-diol monoesters and monoethers. The surface-active compounds are efficient wetting agents, particularly in alkaline solutions, with vastly improved properties.

---

This invention relates to new and valuable chemical compounds. More particularly it relates to esters and ethers of trimethyl pentyl sulfates which in the form of their water soluble salts are new and improved surface active compounds.

The surface active compounds of the invention are excellent wetting and penetrating agents and have better properties than other wetting and penetrating agents available at the present time. The prior art describing surface active agents suitable for use as wetting and penetrating agents is very extensive. However, so far as is known, there is no prior art which describes or teaches the surface active compounds of the invention or their non-salt form.

In accordance with the invention there are provided surface active agents which are much mode efficient as wetting agents than any previously known materials. As compared to known wetting agents about 2 to about 20 times less of the surface active agents of the invention is needed to obtain equivalent results. The surface active agents of the invention are superior in stability to hydrolysis than are other anionic wetting agents. They resist hydrolysis under alkaline conditions and can, therefore, be used in alkaline solutions whereas many anionic surface active agents hydrolyze under alkaline conditions and are unsuitable for use in alkaline solutions.

The surface active compounds of the invention also have superior oxidation stability. For example, the stability in bleach solutions is excellent so that no loss in wetting ability is seen after long periods of use. Further, many of the surface active agents of the invention are useful over a broader range of electrolyte concentrations than the presently available surface active agents.

Another important advantage possessed by the compounds of the invention is that they are easier to prepare. Colorless products of high quality are readily produced with common sulfating agents without the necessity of using solvents and without being very careful of the reaction temperature and the rates at which the reactants are added to the reaction. Other wetting agents prepared, for example from 2-ethylhexanol, tridecanol, etc., give a very yellow product unless great care is taken during both the sulfation and neutralization steps.

The new water soluble, surface active compounds of the invention are prepared by sulfating a compound having the formula:

(I)
$$(CH_3)_2CHCH-\underset{\underset{CH_3}{|}}{\overset{\overset{CH_3}{|}}{C}}-CH_2OR$$
$$\phantom{(CH_3)_2CHCH-}\overset{|}{OH}$$

or the formula:

(II)
$$(CH_3)_2CHCH-\underset{\underset{CH_3}{|}}{\overset{\overset{CH_3}{|}}{C}}-CH_2OH$$
$$\phantom{(CH_3)_2CHCH-}\overset{|}{OR}$$

wherein R is an alkyl group, an aryl group, a $$-\underset{\overset{\|}{O}}{C}-$$

alkyl group, a $$-\underset{\overset{\|}{O}}{C}-$$

aryl group, or mixtures thereof and converting the sulfated product to its water soluble form. When R is $$-\underset{\overset{\|}{O}}{C}-$$

alkyl or $$-\underset{\overset{\|}{O}}{C}-$$

aryl, the glycol monoester resulting is obtained, for example, according to the process described in U.S. Patent 3,091,632. When R is an alkyl group or an aryl group, the glycol monoether resulting can be obtained by reductive cleavage of an appropriate 1,3-dioxane as described hereinafter. In both cases (glycol monoesters and glycol monoethers) the product is a mixture of the primary alcohol (II) and the secondary alcohol (I). Normally, the ratio of primary alcohol to secondary alcohol is 1:3, but this ratio can be varied and pure isomers can be isolated if desired.

When R is an alkyl group it can be either a straight chain or a branched chain alkyl group. So far as we are aware R can be any alkyl group although ordinarily when R is an alkyl group it is an alkyl group containing from 1 to about 12 carbon atoms. Methyl, ethyl, propyl, isopropyl, butyl, isobutyl, sec-butyl, pentyl, 2-methylpentyl, 2,4-dimethyl-pentyl, hexyl, isohexyl, 2-ethylhexyl, 2-ethyl-isohexyl, heptyl, octyl, nonyl, decyl, hendecyl, and dodecyl, for example, are illustrative of the alkyl groups R can be.

When R is an aryl group it can be phenyl, o-tolyl, m-tolyl, p-tolyl, 1-naphthyl or 2-naphthyl, for example.

Acetyl, propionyl, butyryl, isobutyryl, valeryl, isovaleryl, caproyl, heptoyl and caprylyl, for example, are illustrative of the alkacyl $$(-\underset{\overset{\|}{O}}{C}\text{-alkyl})$$

groups R can be.

Benzoyl, o-toluyl, m-toluyl, p-toluyl, α-naphthoyl and β-naphthoyl, for example are illustrative of the $$-\underset{\overset{\|}{O}}{C}\text{-aryl}$$

groups R can be.

The new water soluble surface active compounds of the invention have the formulas:

(III)
$$(CH_3)_2CHCH-\underset{\underset{CH_3}{|}}{\overset{\overset{CH_3}{|}}{C}}H-CHOR$$
$$\phantom{(CH_3)_2CHCH-}\underset{SO_3X}{\overset{|}{O}}$$

and (IV)
$$(CH_3)_2CHCH-\underset{\underset{CH_3}{|}}{\overset{\overset{CH_3}{|}}{C}}-CH_2-O-SO_3X$$
$$\phantom{(CH_3)_2CHCH-}\overset{|}{OR}$$

wherein R has the meaning previously assigned to it and X is any anion forming a water soluble salt.

The alcohols having the Formulas I and II are converted to their sulfate form by sulfation with a sulfating agent such as oleum, sulfur trioxide or chlorosulfonic acid, for example. Normally a mixture of the alcohols having the Formulas I and II are sulfated because the processes used for the manufacture of these alcohols yield mixtures thereof. The sulfation is carried out under conditions normal to the art of sulfation except that in most cases it is not necessary to use a solvent or to be very careful of the reaction temperature. Product of good color and high quality can be obtained under conditions that give a poor quality product with prior art alcohols.

After sulfation the sulfato group is converted to its water soluble salt form by neutralization with a suitable basic reactant. Suitable basic reactants include the carbonates, bicarbonates, and hydroxides of the alkali metals, such as sodium hydroxide, sodium carbonate, sodium bicarbonate, potassium hydroxide, potassium carbonate, potassium bicarbonate, lithium hydroxide, lithium carbonate, and lithium bicarbonate, for example, amines such as ammonia, alkyl amines such as methyl amine, ethyl amine, propyl amine, isopropylamine, butyl amine, hexyl amine, octyl amine, nonyl amine, decyl amine, dodecyl amine and cetyl amine, heterocyclic amines such as morpholine and piperidine, lower alkanolamines such as mono-, di-, and tri-ethanolamine, β-hydroxypropylamine, delta hydroxybutylamine, and the like.

The choice of R' is made on the basis of the intended application. In general, the lower molecular weight compounds are used in the concentrated electrolyte solutions while the higher molecular weight compounds are used in the dilute electrolyte solutions. This is normal in selecting a surface active agent. The surface active properties of an agent are derived from formation of oriented aggregates or micelles. The concentration of surface active agent at which the concentration of these micelles suddenly becomes appreciable is referred to as the "critical micelle concentration" or "CMC." The CMC increases as chain length decreases and the CMC is lowered by salts. Thus, to keep an effective micelle concentration, it is necessary to use shorter chain length agents as the salt concentration increases. In other words, if the surface active agent has too long a chain length in a concentrated salt solution, it will be precipitated and no wetting will be observed. If, on the other hand, the chain length is too short, the surface active agent will not form micelles and no wetting will be observed. In the first case, the compound is listed as being "insoluble" and in the second case, it is listed as being "soluble."

Any unreacted alcohol present in the sulfation reaction mixture is removed when necessary by extraction either before or after the sulfato reaction product is converted to its water soluble salt form. The extraction is normally carried out after the sulfato reaction product has been converted to its water soluble salt form except with the higher molecular weight compounds which are extracted in the acid state to prevent emulsion problems. The water soluble salt form of the compounds of the invention are filtered after their formation to remove any iron precipitates and any other water insoluble materials therefrom to obtain an aqueous solution in the water soluble salt, compounds of the invention containing about 20 to about 45% by weight of active material and minor amounts of other water soluble compounds, e.g. sodium chloride and free caustic when the sodium salt form is being prepared. The water soluble compounds of our invention can be obtained in their dry solid form by evaporation of their aqueous solutions.

The wetting ability of a compound is determined using the Draves-Clarkson test adopted by the American Association of Textile Chemists and Colorists. In this test a three-gram hook with a 40-gram anchor is attached to a standard two-ply, five-gram cotton skein which is dropped into the solution being tested. The time required for the hook to hit the anchor from the skein touches the solution is determined with a stopwatch. This time is recorded as the wetting time. Normally, several determinations are made and plotted so that the weight of wetting agent required to produce a 20-second wetting time can be found. This figure is reported so that direct comparisons of efficiency can be made. All the Draves-Clarkson test determinations reported herein were made at 25° C. unless otherwise noted.

The terms "trimethylpentyl" and "trimethylpentanol" as used herein, unless otherwise indicated, refer to "2,2,4-trimethylpentyl" and "2,2,4-trimethylpentanol," respectively.

The following examples illustrate the invention.

Example 1.—Preparation of sodium ethoxytrimethylpentyl Sulfate

To a two-liter, three-neck flask equipped with a stirrer, condenser, thermowell, and addition funnel were charged 174 grams (one mole) of ethoxytrimethylpentanol (a 2.7:1 by weight ratio mixture of secondary alcohol to primary alcohol) and 250 ml. of isopentane. The resulting solution was cooled to 3° C. and 121 grams (1.05 moles) of chlorosulfonic acid was slowly added while maintaining a nitrogen sweep through the reactor. After addition of the chlorosulfonic acid, the reaction mixture was nitrogen purged with stirring for 30 minutes to remove hydrogen chloride. The reaction mixture was then neutralized with 400 grams of 10 percent aqueous sodium hydroxide added slowly followed by 50.6 grams of 20 percent aqueous sodium hydroxide followed by 30 grams of 20 percent aqueous sodium carbonate. The isopentane layer was then separated and the water solution was extracted with petroleum ether followed by vacuum stripping to remove residual ether. The product thus obtained was a clear, colorless water solution containing 42 percent sodium ethoxytrimethylpentyl sulfate, 0.86 percent sodium hydroxide, 0.63 percent sodium chloride, and 0.063 percent sodium carbonate. The color of the solution was less than APHA 5.

Example 2.—Preparation of sodium trimethylpentyl isobutyrate sulfate

The procedure described in Example 1 was followed except that trimethylpentanediol - 1,3 - isobutyrate ("Texanol") was used instead of ethoxytrimethylpentanol. The product was a colorless, clear solution containing 38 percent sodium isobutyroxytrimethylpentyl sulfate.

Example 3.—Preparation of sodium isobutoxytrimethylpentyl sulfate using ethyl ether as a solvent To a one-liter, three-neck flask equipped with a stirrer, condenser, thermowell, and addition funnel was charged 200 ml. of ethyl ether. The ether was cooled to 0° C. and 127 grams (1.1 moles) of chlorosulfonic acid was added with stirring. To the cold acid solution was slowly added 202 grams (1 mole) of isobutoxytrimethylpentanol (a 3:1 weight ratio mixture of secondary alcohol to primary alcohol) dissolved in 200 ml. of ethyl ether while stirring and maintaining the temperature at —3 to 0° C. The addition required one hour. The reaction mixture was then stirred for 15 minutes and purged with nitrogen to remove hydrogen chloride. The reaction mixture was poured over 100 grams of crushed ice and neutralized at 5–8° C. with 30 percent sodium hydroxide solution. The aqueous product was extracted with petroleum ether and stripped under vacuum to give a colorless solution containing 41.2 percent sodium isobutoxytrimethylpentyl sulfate, 0.69 percent sodium chloride, and 0.057 percent base as sodium carbonate. The color of the solution was less than APHA 5.

Example 4.—Preparation of sodium isobutoxytrimethylpentyl sulfate without using a solvent The preparation described in Example 3 was the classical technique used to prevent color formation. This example shows that the usual precautions can be ignored without harm to product quality.

Example 3 was repeated except that no solvent was used and the reaction temperature was allowed to rise to 15° C. No color was developed. The product obtained was identical in appearance and wetting properties to the product obtained in Example 3.

Example 5.—Preparation of sodium 2-methylpentoxytrimethylpentyl sulfate

The procedure described in Example 1 was followed except that 2-methylpentoxytrimethylpentanol was used instead of ethoxytrimethylpentanol. The product was a water white solution containing 22 percent sodium 2-methylpentoxytrimethylpentyl sulfate and minor amounts of sodium chloride, sodium hydroxide, and sodium carbonate.

Example 6.—Preparation of sodium 2-ethylhexoxytrimethylpentyl sulfate

To a one-liter, three-neck flask equipped with a stirrer, condenser, thermowell, and addition funnel was charged 20 ml. of isopentane and 129 grams (0.5 mole) of 2-ethylhexoxytrimethylpentanol (a 3:2 ratio by weight of secondary to primary alcohol). The mixture was cooled to 0° C. and 220 grams of 20 percent oleum was added with stirring over a 50-minute period while maintaining the temperature at 0–5° C. and a nitrogen sweep through the reactor. After the addition of oleum was complete, the stirring was continued for 20 minutes. The reaction mixture thus obtained which was viscous and deep orange in color was poured into 400 grams of crushed ice. Three layers were formed and were separated. The top layer weighed 442.1 grams, the middle layer weighed 364.1 grams, and the bottom layer weighed 52.1 grams. The bottom layer was discarded. The middle layer was extracted three times with 200-ml. portions of isopentane. These extracts were combined with the top layer. The combined extracts and top layer were washed with 100 ml. of 1 percent sodium carbonate and distilled to recover 46.6 grams (36.2 percent) of the original 2-ethylhexoxytrimethylpentanol. The extracted middle layer was neutralized with 25 percent aqueous sodium hydroxide. The color changed from deep orange to light yellow. The neutral solution was evaporated to give a soft white solid which contained 69.2 percent of sodium 2-ethylhexoxytrimethylpentyl sulfate.

Example 7.—Sodium decoxytrimethylpentyl sulfate

Example 6 was repeated using 143 grams (0.5 mole) of decoxytrimethylpentanol (3:1 secondary to primary alcohol ratio) in place of 2-ethylhexoxytrimethylpentanol. A soft white solid which was principally sodium decoxytrimethylpentyl sulfate was obtained.

Example 8.—Sodium phenoxytrimethylpentyl sulfate

Example 6 was repeated using 111 grams (0.5 mole) of phenoxytrimethylpentanol in place of 2-ethylhexoxytrimethylpentanol. A soft white solid which was principally sodium phenoxytrimethylpentyl sulfate was obtained.

Example 9.—Sodium α-naphthoxytrimethylpentyl sulfate

Example 6 was repeated using 129 grams (0.5 mole) of α-naphthoxytrimethylpentanol in place of 2-ethylhexoxytrimethylpentanol. A soft white solid which was principally sodium α-naphthoxytrimethylpentyl sulfate was obtained.

Example 10.—Sodium 4-(oxybenzyl)phenoxytrimethylpentyl sulfate

Example 6 was repeated using 164 grams (0.5 mole) of 4-(oxybenzyl)phenoxytrimethylpentanol in place of 2-ethylhexoxytrimethylpentanol. A soft white solid which was principally sodium 4-(oxybenzyl)phenoxytrimethylpentyl sulfate was obtained.

Example 11.—Wetting properties

The water soluble salt form of the compounds of the invention are excellent wetting agents in a variety of electrolyte solutions. Table 1 gives the wetting characteristics of the products prepared in Examples 1, 2, 3, 4, 5, 6 and 7 while Table 2 gives the wetting characteristics of the products prepared in Examples 8, 9 and 10. The wetting was determined by the Draves-Clarkson test discussed hereinbefore. The term "soluble" (S) means no wetting is obtained at reasonable concentrations (3 percent or more of the wetting agent in the solution). The term "insoluble" (I) means no wetting is obtained with a saturated solution. The significance of these two circumstances has been discussed hereinbefore.

The data is recorded as the weight percent of 100 percent active wetting agent required to give a wetting time of 20 seconds. It is seen in Table 1 that the invention report compounds are efficient wetting agents in sodium hydroxide, sodium carbonate, acetic acid, sulfuric acid, and phosphoric acid solutions, for example.

TABLE 1.—WETTING PROPERTIES

[Weight percent required to give a 20-second wetting time (Draves-Clarkson test at 25°C.)]

| Electrolyte Solution | Wetting Agent From Example— | | | | | |
|---|---|---|---|---|---|---|
| | 1 | 2 | 3 or 4 | 5 | 6 | 7 |
| Water | S | S | 1.56 | 0.46 | 0.032 | 0.010 |
| 1% Sodium Hydroxide | S | 1.63 | 1.15 | 0.17 | 0.028 | 0.014 |
| 5% Sodium Hydroxide | 0.82 | 0.72 | 0.23 | 0.062 | I | I |
| 10% Sodium Hydroxide | 0.78 | 0.073 | 0.096 | I | I | I |
| 25% Sodium Hydroxide | 0.072 | I | I | I | I | I |
| 1% Sodium Carbonate | S | 1.83 | 1.11 | 0.72 | 0.038 | 0.022 |
| 5% Sodium Carbonate | 2.66 | 0.33 | 0.15 | 0.083 | 0.044 | 0.019 |
| 10% Sodium Carbonate | 1.40 | 0.093 | 0.092 | 0.020 | 0.24 | 0.011 |
| 1% Acetic Acid | S | 2.26 | 1.28 | 0.64 | 0.054 | 0.048 |
| 5% Acetic Acid | S | 1.63 | 1.25 | 0.46 | 0.048 | 0.040 |
| 10% Acetic Acid | S | 1.30 | 1.12 | 0.45 | 0.041 | 0.041 |
| 20% Acetic Acid | S | 0.80 | 0.94 | 0.23 | 0.035 | 0.021 |
| 1% Sulfuric Acid | S | 1.85 | 0.94 | 0.22 | 0.028 | 0.036 |
| 5% Sulfuric Acid | S | 1.52 | 0.35 | 0.14 | 0.035 | 0.019 |
| 10% Sulfuric Acid | S | 1.06 | 0.23 | 0.064 | 0.038 | I |
| 20% Sulfuric Acid | 1.57 | 0.41 | 0.071 | 0.023 | I | I |
| 1% Phosphoric Acid | S | 2.72 | 1.80 | 0.84 | 0.072 | 0.028 |
| 5% Phosphoric Acid | S | 1.09 | 1.25 | 0.51 | 0.053 | 0.016 |
| 10% Phosphoric Acid | S | 0.60 | 1.13 | 0.23 | 0.038 | I |

TABLE 2.—WETTING PROPERTIES

[Weight percent required to give a 20-second wetting time (Draves Clarkson test at 25°C.)]

| Electrolyte Solution | Wetting Agent From Example— | | |
|---|---|---|---|
| | 8 | 9 | 10 |
| Water | 0.25 | 0.02 | 0.008 |
| 1% Sodium Hydroxide | 0.10 | 0.23 | 0.010 |
| 5% Sodium Hydroxide | 0.03 | (*) | (*) |
| 1% Acetic Acid | 0.52 | 0.042 | 0.023 |
| 10% Acetic Acid | 0.31 | 0.023 | 0.012 |
| 1% Phosphoric Acid | 0.41 | 0.032 | 0.012 |
| 10% Phosphoric Acid | 0.11 | 0.015 | (*) |

* Insoluble.

Example 12.—Comparative wetting properties

While the water soluble salt form of the compounds of the invention are efficient wetting agents in a variety of electrolyte solutions, they are especially efficient in caustic solutions. The sodium salt of the compounds prepared in Examples 1, 2, 3, 4, 5, 6 and 7 were compared as wetting agents in 0, 1, 5, 10 and 25 percent aqueous NaOH solutions with seven commonly used wetting agents. The results obtained are set forth in Table 3. In each caustic concentration one of the compounds of the invention is a more efficient wetting agent than any of the commonly used wetting agents tested. The commonly used wetting agents tested represent a wide variety of materials ranging from low molecular weight to high molecular weight compounds of phosphate, nonionic, and anionic alcohol sulfate types.

TABLE 3.—COMPARATIVE WETTING PROPERTIES IN CAUSTIC SOLUTIONS

[Weight percent required to give a 20-second wetting time (Draves-Clarkson test at 25° C.)]

| Wetting Agents | NaOH Concentration, Percent | | | | |
|---|---|---|---|---|---|
| | 0 | 1 | 5 | 10 | 25 |
| Na ethoxytrimethylpentyl sulfate (Example 1) | S | S | 0.82 | 0.77 | 0.072 |
| Na trimethylpentyl isobutyrate sulfate (Example 2) | S | 1.63 | 0.72 | 0.076 | I |
| Na isobutoxytrimethylpentyl sulfate (Example 3 or 4) | 1.56 | 1.16 | 0.23 | 0.096 | I |
| Na 2-methylpentoxytrimethylpentyl sulfate (Example 5) | 0.46 | 0.17 | 0.062 | I | I |
| Na 2-ethylhexoxytrimethylpentyl sulfate (Example 6) | 0.032 | 0.020 | I | I | I |
| Na decoxytrimethylpentyl sulfate (Example 7) | 0.010 | 0.014 | I | I | I |
| "Tergitol 08" (Na 2-ethylhexyl sulfate) | 2.54 | 0.72 | 0.62 | 0.19 | I |
| "Dowfax 9N4" (Nonylphenol+4 moles of ethylene oxide) | I | I | I | I | I |
| "Tergitol NPX" (Nonylphenol+10.5 moles of ethylene oxide) | 0.40 | 0.30 | I | I | I |
| "Tergitol 4" (Na 2-Me-7-ethylundecyl-4 sulfate) | 1.26 | 0.62 | 0.41 | I | I |
| "Aerosol O.T." (Na di(2-ethylhexyl) sulfosuccinate) | 0.018 | 0.22 | I | I | I |
| "Tergitol P-28" (Na di(2-ethylhexyl) phosphate) | 0.34 | 0.22 | 0.16 | I | I |
| Cresylic acid+1% 2-ethylhexanol | S | S | S | S | *1.86 |

*Cloudy and a bad odor.
S="Soluble" i.e., wetting time greater than 180 seconds at concentrations of 3 percent or less.
I="Insoluble" i.e., wetting time greater than 180 seconds for the saturated solution.

Example 13.—Hydrolytic stability

The compounds of the invention have excellent hydrolytic stability. This is demonstrated by comparing the increase in wetting time in 5 percent sodium hydroxide solution between sodium isobutoxytrimethylpentyl sulfate and Tergitol P-28. Table 3 shows that Tergitol P-28 was the most efficient prior art wetting agent found for 5 percent sodium hydroxide solution. The solutions were made up in concentrations such that the wetting time was the same, i.e., both had a 20-second wetting time in 5 percent NaOH solution using the Draves-Clarkson test at 25° C. The wetting time was checked after 26 hours and after 96 hours at ambient temperature. The test was repeated holding the temperature of the solutions at 60° C. The results obtained are shown in Table 4.

TABLE 4.—HYDROLYTIC STABILITY IN 5 PERCENT NaOH

| Wetting Agent | Percent Increase in Wetting Time | | | |
|---|---|---|---|---|
| | 23° C. | | 60° C. | |
| | 26 hours | 96 hours | 26 hours | 96 hours |
| Tergitol P-28 | 0 | 67.0 | 74.0 | 88.0 |
| Na isobutoxytrimethylpentyl sulfate | 0 | 4.7 | 0 | 19.0 |

Example 14.—Bleach solution stability

Not many wetting agents are stable in bleach solutions. This is pointed out in a Union Carbide Chemicals Company's brochure on "Tergitol" surfactants where it is stated, "It (Tergitol 08) is one of the few anionic surface-active agents stable in the presence of concentrated bleaching powder solutions." Sodium isobutoxytrimethylpentyl sulfate and sodium 2-ethylhexoxytrimethylpentyl sulfate were compared to Tergitol 08 for bleach solution stability. The concentration required to give a 20-second wetting time in 1.1 percent sodium hypochlorite solution at 25° C. and the percent decrease in efficiency after standing 125 hours are shown in Table 5.

TABLE 5.—WETTING IN 1.1 PERCENT SODIUM HYPOCHLORITE SOLUTION (25° C.)

| Wetting Agent | Weight Percent Required to Give a 20-Second Wetting Time | Percent Decrease in Efficiency After 125 Hours |
|---|---|---|
| Tergitol 08 | 1.26 | 63 |
| Na isobutoxytrimethylpentyl sulfate | 0.64 | 0 |
| Na 2-ethylhexoxytrimethylpentyl sulfate | 0.032 | 0 |

Table 5 shows that it takes less sodium isobutoxytrimethylpentyl sulfate or sodium 2-ethylhexoxytrimethylpentyl sulfate than Tergitol 08 to give a 20 second wetting time in a 1.1% sodium hypochlorite solution at 25° C.; and that the first two named compounds undergo no decrease in efficiency after standing for 125 hours in the 1.1% sodium hypochlorite solution whereas Tergitol 08 undergoes a 63% decrease in efficiency.

The comparative tests given herein show that the wetting agents of the invention are superior to a representative variety of known wetting agents for example, in efficiency, hydrolytic stability and bleach solution stability.

The compounds having the Formula I or the Formula II wherein R is an alkyl group or an aryl group can be prepared by reductive cleavage of a 1,3-dioxane compound having the formula:

(V)

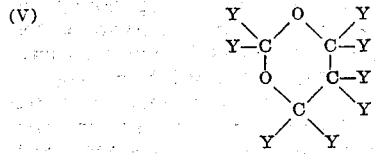

wherein Y represents hydrogen, alkyl, aryl substituted alkyl or substituted aryl. When Y is aryl it is usually phenyl or a substituted phenyl radical. Normally at least four of the Y's are hydrogen. The reductive cleavage is advantageously carried out with hydrogen under pressure in the presence of a palladium on alumina catalyst. The catalyst can be in powder or pellet form.

The compounds and process referred to in the preceding paragraph are described and claimed in copending U.S. application Ser. No. 511,350 filed Dec. 3, 1965, in the names of Frank C. Canter and Alfred G. Robinson. Representative illustrations of the compounds and process are given in the examples set forth hereinafter.

Example 15

One mole (200 grams) of 2,4-diisopropyl-5,5-dimethyl-1,3-dioxane was charged to a stirred autoclave along with 20 grams of powdered 5 percent palladium on alumina catalyst. The autoclave was heated to 225° C., and the pressure was brought to 5000 p.s.i.g. by addition of hydrogen. Reaction at these conditions for four hours gave essentially complete reduction to a mixture of 3-isobutoxy-2,2,4-trimethylpentan-1-ol and 1-isobutoxy-2,2,4-trimethylpentan-3-ol. The product boiled over the range 226–232° C.

Example 16

An autoclave of 1800 ml. capacity, provided with top and bottom openings, was packed with ⅛-inch pellets of 0.5 percent palladium on alumina catalyst. The reactor was heated to 245° C. Hydrogen pressure of 5000 p.s.i.g. was applied to the reactor. Under the above conditions, 2,4-diisopropyl-5,5-dimethyl-1,3-dioxane was passed through at such a rate as to give a contact time of 15 minutes. Ninety percent of the feed was converted to a mixture of two parts 1-isobutoxy-2,2,4-trimethylpentan-3-ol to one part of 3-isobutoxy-2,2,4-trimethylpentan-1-ol.

Example 17

Reduction of 5,5-dimethyl-2-(1-ethylpentyl)-4-isopropyl-1,3-dioxane according to the procedure of Example 15 gave a 78 percent conversion to a mixture of 3-(2- ethylhexoxy)-2,2,4-trimethylpentan-1-ol and 1-(2-ethylhexoxy)-2,2,4-trimethylpentan-3-ol.

Example 18

Reduction of 5,5-dimethyl-4-isopropyl-1,3-dioxane by the procedure of Example 1 gave an 83 percent conversion to a mixture of 3-methoxy-2,2,4-trimethylpentan-1-ol and 1-methoxy-2,2,4-trimethylpentan-3-ol. The boiling range of the product was 186–193° C.

Example 19

Using the procedure of Example 1, 5,5-dimethyl-4-isopropyl-2-methyl-1,3-dioxane was reduced to a mixture (75 percent conversion) of 1-ethoxy-2,2,4-trimethylpentan 3-ol and 3-ethoxy-2,2,4-trimethylpentan-1-ol.

The compounds specifically described hereinbefore are intended to be illustrative and not limitative of the compounds of the invention. Thus Sodium 1-methoxy-2,2,4-trimethylpentyl sulfate,
Sodium 3-methoxy-2,2,4-trimethylpentyl sulfate,
Sodium 1-propoxy-2,2,4-trimethylpentyl sulfate,
Sodium 3-propoxy-2,2,4-trimethylpentyl sulfate,
Sodium 1-isopropoxy-2,2,4-trimethylpentyl sulfate,
Sodium 3-isopropoxy-2,2,4-trimethylpentyl sulfate,
Sodium 1-butoxy-2,2,4-trimethylpentyl sulfate,
Sodium 3-butoxy-2,2,4-trimethylpentyl sulfate,
Sodium 1-pentoxy-2,2,4-trimethylpentyl sulfate,
Sodium 3-pentoxy-2,2,4-trimethylpentyl sulfate,
Sodium 1-hexoxy-2,2,4-trimethylpentyl sulfate,
Sodium 3-hexoxy-2,2,4-trimethylpentyl sulfate,
Sodium 1-heptoxy-2,2,4-trimethylpentyl sulfate,
Sodium 3-heptoxy-2,2,4-trimethylpentyl sulfate,
Sodium 1-octoxy-2,2,4-trimethylpentyl sulfate,
Sodium 3-octoxy-2,2,4-trimethylpentyl sulfate,
Sodium 1-acetoxy-2,2,4-trimethylpentyl sulfate,
Sodium 3-acetoxy-2,2,4-trimethylpentyl sulfate,
Sodium 1-propionyloxy-2,2,4-trimethylpentyl sulfate,
Sodium 3-propionyloxy-2,2,4-trimethylpentyl sulfate,
Sodium 1-butyryloxy-2,2,4-trimethylpentyl sulfate,
Sodium 3-butyryloxy-2,2,4-trimethylpentyl sulfate,
Sodium 1-valeryloxy-2,2,4-trimethylpentyl sulfate,
Sodium 3-valeryloxy-2,2,4-trimethylpentyl sulfate,
Sodium 1-isovaleryloxy-2,2,4-trimethylpentyl sulfate,
Sodium 3-isovaleryloxy-2,2,4-trimethylpentyl sulfate,
Sodium 1-hexanoyloxy-2,2,4-trimethylpentyl sulfate,
Sodium 3-hexanoyloxy-2,2,4-trimethylpentyl sulfate,
Sodium 1-heptanoyloxy-2,2,4-trimethylpentyl sulfate,
Sodium 3-heptanoyloxy-2,2,4-trimethylpentyl sulfate,
Sodium 1-octanoyloxy-2,2,4-trimethylpentyl sulfate,
Sodium 3-octanoyloxy-2,2,4-trimethylpentyl sulfate,
Sodium 1-benzoyloxy-2,2,4-trimethylpentyl sulfate,
Sodium 3-benzoyloxy-2,2,4-trimethylpentyl sulfate,
Sodium 1-(o-toluoyloxy)-2,2,4-trimethylpentyl sulfate,
Sodium 3-(o-toluoyloxy)-2,2,4-trimethylpentyl sulfate,
Sodium 1-($\alpha$-naphthoyloxy)-2,2,4-trimethylpentyl sulfate, and
Sodium 3-($\alpha$-naphthoyloxy)-2,2,4-trimethylpentyl sulfate, for example can also be prepared.

When a mixture of alcohols is sulfated, a mixture of sulfate compounds is obtained. To illustrate, in Example 1 sodium ethoxytrimethylpentyl sulfate is a mixture of sodium 1-ethoxy-2,2,4-trimethylpentyl sulfate and sodium 3-ethoxy-2,2,4-trimethylpentyl sulfate. Similarly, in Examples 3 and 4 sodium isobutoxy-2,2,4-trimethylpentyl sulfate is a mixture of sodium 1-isobutoxy-2,2,4-trimethylpentyl sulfate and sodium 3-isobutoxy-2,2,4-trimethylpentyl sulfate.

While the surface active compounds of the invention have been illustrated with reference to their sodium salt form it is to be clearly understood that any water soluble salt form can be prepared, i.e. as noted hereinbefore X is any anion forming a water soluble salt. Numerous other water soluble salt forms are specifically disclosed hereinbefore and can be readily prepared by those skilled in the art to which this invention is directed. From an economical viewpoint the sodium salt form is the least expensive to prepare. When an aqueous solution of the sodium sulfate salt is prepared the solution can be buffered with sodium carbonate, for example. As previously noted the aqueous solutions of the water soluble salt compounds of the invention ordinarily contain about 20 to about 45% by weight of active material.

The non-salt form of the sulfate compounds of the invention are soluble in water but are not surface active agents. The surface active compounds derived from the primary alcohols appear to be better wetting agents than the surface active agents obtained from the secondary alcohols.

As indicated hereinbefore normally a mixture of the alcohols having the Formulas I and II are sulfated because the processes used for the manufacture of these alcohols yield mixtures thereof and for the purposes of the present invention there is no need to separate the alcohols. However, if desired, the alcohols can be separated, for example, by fractional distillation under reduced pressure in an efficient distillation column. 1-isobutoxytrimethylpentanol-3 was separated from 3-isobutoxytrimethylpentanol-1 as described in Example 20.

Example 20

1-isobutoxytrimethylpentanol-3 was separated from 3-isobutoxytrimethylpentanol-1 by distillation in a 100-tray Oldershaw column. The mixed alcohols comprising a 3:1 mixture of secondary to primary alcohol were distilled at reduced pressure at a 10:1 reflux ratio. The mixed alcohols boiled at 224–234° C. at 760 mm. The 1-isobutoxytrimethylpentanol-3 was collected at 106–110° C. at 15 mm. and the 3-isobutoxytrimethylpentanol-1 was collected at 116–120° C. at 15 mm. The recovered alcohols had the following physical properties.

|  | Primary Alcohol | Secondary Alcohol |
| --- | --- | --- |
| B.P. (15 mm.), ° C. | 116–120 | 106–110 |
| Sp. Gr. (20° C./20° C.) | 0.918 | 0.876 |
| Index of Refraction (25° C., D) | 1.43697 | 1.43069 |

Example 21.—Sulfation of 3-isobutoxytrimethylpentanol-1

Charged 202 grams (1 mole) of 3-isobutoxytrimethylpentanol-1 to a 2 liter, 3-neck flask equipped with a stirrer, condenser, thermowell, and addition funnel. Charged 400 milliliters of isopentane and cooled the mixture to 0° C. Added with stirring at 0–10° C. over a 1.5-hour period 121 grams of chlorosulfonic acid (1.05 moles). A slow stream of dry nitrogen was passed through the reactor to help remove hydrogen chloride. After addition was complete, the reaction mixture was stirred for an additional 15 minutes and then it was poured over 150 grams of crushed ice. The mixture was then neutralized with 235.6 grams of 25 percent NaOH. The aqueous solution was extracted with two 100-milliliter portions of isopentane. Evaporation of the isopentane gave 4.1 grams of recovered alcohol (2.03 percent of the original charge). Evaporation of the water solution gave 317 grams of the sodium salt in the form of a light yellow solid.

Example 22.—Sulfation of 1-isobutoxytrimethylpentanol-3

Charged 202 grams (1 mole) of 1-isobutoxytrimethylpentanol-3 and 400 milliliters of isopentane to a 2-liter flask equipped as before. Cooled to 0° C. and added 121 grams (1.05 moles) of chlorosulfonic acid over a 1-hour period with stirring and holding the temperature at 0–10° C. A slow stream of dry nitrogen was passed through the reactor to help remove hydrogen chloride. After the addition was complete, the reaction mixture was stirred for an additional 30 minutes. On standing, the reaction mixture separated into two phases. The upper phase was separated and washed with dilute (1 percent) sodium carbonate solution. The bottom phase was poured over 150 grams of crushed ice and neutralized with 200 grams of 25 percent sodium hydroxide. The neutralized solution was extracted with two 100-milliliter portions of isopentane. The isopentane was combined with the above washed upper phase and the total was evaporated to give 14.9 grams of recovered alcohol (7.2 percent of the original charge). Evaporation of the water solution gave 316.1 grams of a colorless, viscous grease or gel-like material.

EVALUATION OF WETTING PROPERTIES

The Bundle Wetting Time (AATCC Standard Test Method 43-1952) was determined at 25° C. for the two products of Examples 21 and 22 in a variety of electrolyte solutions. Several determinations were made at various concentrations of wetting agent in each electrolyte solution and the amount required (on a 100 percent active basis) to give a 20-second wetting time was calculated. The results obtained are set forth in Table 6.

TABLE 6.—WETTING PROPERTIES
[Weight percent required to give 20-second wetting (AATCC Standard Test Method 43-1952)]

| Electrolyte Solution | Sodium Sulfate of— | |
|---|---|---|
| | 3-isobutoxytrimethylpentanol-1 | 1-isobutoxytrimethylpentanol-3 |
| Water | 1.3 | 2.6 |
| 5% Sodium Hydroxide | 0.44 | 0.65 |
| 25% Sodium Hydroxide | 0.03 | 0.76 |
| 5% Sulfuric Acid | 0.50 | 0.75 |
| 20% Sulfuric Acid | 0.15 | 0.25 |
| 5% Hydrochloric Acid | 0.38 | 0.67 |
| 20% Hydrochloric Acid | 0.22 | 0.48 |

The surface active compounds of the invention are non-toxic and relatively odorless. While useful for the purposes surface active compounds are normally employed because of their stability in alkaline solution they are particularly useful as penetrants in the mercerization of cotton. The aryltrimethylpentyl sulfate compounds of the invention such as those of Examples 8, 9 and 10, for example, are compatible with organic solvents such as benzene and perchloroethylene, and are of particular value in dry cleaning and degreasing applications and in producing "soluble oils."

Briefly if a wetting agent is desired for use in a concentrated electrolyte solution, the member R will have a low molecular weight. The more dilute the electrolyte solution the larger the R group molecular weight. Also, as just indicated, system compatibility is a factor. For example, a wetting agent to be used in a drycleaning process would use a compound wherein R is an aryl group.

As indicated hereinbefore X can be a metal such as sodium, lithium and potassium. In addition to the Group IA metals just mentioned X can also be any of the other Group IA metals i.e. rubidium, caesium and virginium (verium). For economic reasons when X is a metal anion it is usually sodium.

The invention has been described in detail with particular reference to preferred embodiments thereof, but it will be understood that variations and modifications can be effected within the spirit and scope of the invention as described hereinbefore and as defined in the appended claims.

We claim:
1. A compound selected from the compounds having the formulas:

(1) 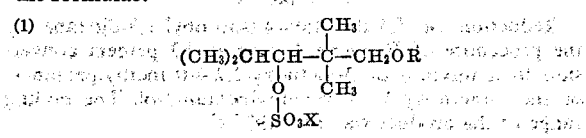

and (2) 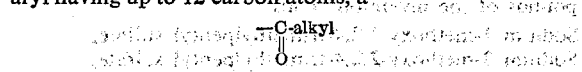

wherein R represents a member selected from the group consisting of an alkyl having up to 12 carbon atoms, an aryl having up to 12 carbon atoms, a $$-\underset{\underset{O}{\|}}{C}-alkyl$$

wherein said alkyl has up to 12 carbon atoms and a $$-\underset{\underset{O}{\|}}{C}-aryl$$

wherein said aryl has up to 12 carbon atoms and X represents a member selected from the group consisting of hydrogen and an anion forming a water soluble salt.

2. A compound having the formula:

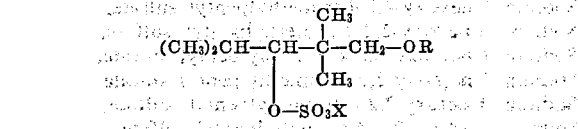

wherein R represents a member selected from the group consisting of alkyl and aryl, each having up to 12 carbon atoms and X represents a member selected from the group consisting of hydrogen and an anion forming a water-soluble salt.

3. A compound having the formula:

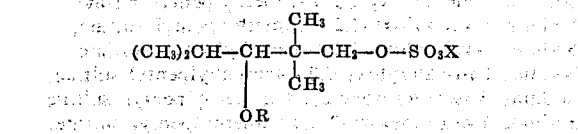

wherein R represents a member selected from the group consisting of alkyl and aryl, each having up to 12 carbon atoms and X represents a member selected from the group consisting of hydrogen and an anion forming a water-soluble salt.

4. The compounds of claim 1 wherein R is ethyl.
5. The compounds of claim 1 wherein R is isobutyl.
6. The compounds of claim 1 wherein R is 2-ethylhexyl.
7. Sodium ethoxy-2,2,4-trimethylpentyl sulfate.
8. Sodium isobutoxy-2,2,4-trimethylpentyl sulfate.

References Cited
UNITED STATES PATENTS
3,091,632  5/1963  Hagemeyer ———————— 260—476

CHARLES B. PARKER, Primary Examiner.
L. C. MARUZO, Assistant Examiner.